(12) United States Patent
Kampe et al.

(10) Patent No.: US 7,039,694 B2
(45) Date of Patent: May 2, 2006

(54) CLUSTER MEMBERSHIP MONITOR

(75) Inventors: Mark A. Kampe, Los Angeles, CA (US); David Penkler, Meylan (FR); Rebecca A. Ramer, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 810 days.

(21) Appl. No.: 09/847,044

(22) Filed: May 2, 2001

(65) Prior Publication Data
US 2002/0042693 A1    Apr. 11, 2002

Related U.S. Application Data

(60) Provisional application No. 60/201,210, filed on May 2, 2000, provisional application No. 60/201,099, filed on May 2, 2000.

(51) Int. Cl.
G06F 15/177   (2006.01)
(52) U.S. Cl. ...................... 709/222; 709/216; 709/218
(58) Field of Classification Search ........ 709/217–226, 709/208, 211–213; 714/1–4, 11–13
See application file for complete search history.

(56) References Cited

U.S. PATENT DOCUMENTS

| | | | |
|---|---|---|---|
| 5,323,384 A | 6/1994 | Norwood et al. ............. 370/16 |
| 5,390,326 A | 2/1995 | Shah ........................ 395/575 |
| 6,330,605 B1 * | 12/2001 | Christensen et al. ........ 709/226 |
| 6,401,120 B1 * | 6/2002 | Gamache et al. ........... 709/226 |
| 6,532,494 B1 * | 3/2003 | Frank et al. ................. 709/224 |
| 6,687,751 B1 * | 2/2004 | Wils et al. .................. 709/230 |
| 6,718,361 B1 * | 4/2004 | Basani et al. ............... 709/201 |
| 6,725,264 B1 * | 4/2004 | Christy ....................... 709/225 |
| 6,728,905 B1 * | 4/2004 | Gnanasivam et al. ......... 714/43 |
| 6,748,381 B1 * | 6/2004 | Chao et al. ................... 707/10 |

OTHER PUBLICATIONS

XP-000783249—Haartsen, J., "Bluetooth-The Universal Radio Interface for Ad Hoc, Wireless Connectivity", Ericsson Review No. 3, 1998, pp. 110-117.
XP-002149764—Droms, R., "Dynamic Host Configuration Protocol", Network Working Group, Bucknell University, Mar. 1997, pp. 1-3, 12, 13, 15-19.
XP-002178476—Edwards, K., "Core Jini", The Sun Microsystems Press, Prentice Hall, Inc., Jun. 1999, pp. 64-76, 147 & 244.

* cited by examiner

Primary Examiner—Glenton B. Burgess
Assistant Examiner—Yasin Barqadle
(74) Attorney, Agent, or Firm—Kent A. Lembke; William J. Kubida; Hogan & Hartson LLP

(57) ABSTRACT

The present invention provides a system and method within a high availability network for monitoring and managing cluster membership. The cluster membership monitor provides the ability to maintain a list of current cluster members, monitor status of each peer node on the cluster, stay apprised of each nodes viability, elect a master node for the cluster when necessary, and coordinate reformation as members join and leave the cluster.

3 Claims, 3 Drawing Sheets

CLUSTER MEMBERSHIP MONITOR

CROSS-REFERENCE TO RELATED APPLICATIONS

This application claims the benefit of U.S. Provisional Patent Application No. 60/201,210 filed May 2, 2000, and entitled "Cluster Membership Monitor", and U.S. Provisional Patent Application No. 60/201,099, filed May 2, 2000 and entitled "Carrier Grade High Availability Platform", which are hereby incorporated by reference.

BACKGROUND OF THE INVENTION

1. Field of the Invention

This invention relates to cluster management of a carrier-grade high availability platform, and more particularly, to a management system and method for managing, maintaining, and using cluster membership data.

2. Discussion of the Related Art

High availability computer systems provide basic and real-time computing services. In order to provide highly available services, members of the system must be aware or capable of being aware of the viability and accessibility of services and hardware components in real-time.

Computer networks allow data and services to be distributed among computer systems. A clustered network provides a network with system services, applications and hardware divided into nodes that can join or leave a cluster as is necessary. A clustered high availability computer system must maintain cluster information in order to provide services in real-time. Generally this creates a large overhead and commitment of system resources ultimately slowing system response. System costs are also increased by the need for additional memory and storage space for the applications used to monitor system viability.

SUMMARY OF THE INVENTION

The present invention is directed to providing an innovative system and method for monitoring cluster memberships within a clustered computer network that substantially obviates one or more of the problems due to limitations and disadvantages or the related art. An object of the present invention is to provide an innovative system and method for managing, maintaining, and using cluster membership data within a clustered computer network.

It is an additional object of the present invention to maintain knowledge of the current cluster members.

It is also an object of the present invention to provide notification throughout the cluster of node join and leave events.

It is a further object of the present invention to provide a method to verify viability of the cluster members.

It is an additional object of the present invention to provide a method for electing master and vice-master nodes for a cluster.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these other advantages and in accordance with the purpose of the present invention, as embodied and broadly described, a cluster membership monitor is distributed throughout the cluster as monitor entities on each node of the cluster. The monitor entities provide a mechanism for each peer node to maintain knowledge of current cluster members. This knowledge may be dynamic and may not be persistently stored. Cluster membership change notifications are provided to highly available services and highly available aware applications. These notifications can be used to coordinate any highly available service changes when peer nodes join or leave the cluster.

In accordance with a further aspect of the invention, a method is provided for joining a node to a cluster and establishing master and vice-master nodes within the cluster.

In accordance with an additional aspect of the invention, a method is provided for a master node to verify viability of the nodes within a cluster and to take appropriate action if a node is non-responsive.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

The present invention, referred to in this embodiment as the cluster membership monitor, provides a distributed service through the collaboration of individual monitor entities, each running on a peer node in a cluster. The role of the cluster membership monitor is to monitor the responsiveness of the configured peer nodes of a cluster, maintain the list of responsive nodes constituting the cluster members and to elect one node as the cluster master. Upon detecting a change in cluster membership the cluster membership monitor logs the event and notifies a cluster coordination function. Upon cluster reformation or the failure of the master node the monitor elects a new master node.

APIs are also provided to: 1) query the cluster membership and master identity; and 2) request a re-read of the configured cluster node list. The cluster membership monitor also exports an API that provides cluster membership information and status to other common cluster services, to highly available services, to distributed system services (DSS), and to highly available aware applications.

A cluster consists of some number of peer nodes that cooperate to provide a highly available service. If a node in the cluster fails or is brought offline, the cluster continues to provide the service. The cluster membership monitor considers the interconnected peer nodes of a cluster to be cluster members.

Within a cluster, there is a set of core highly available services that use a 2-n redundancy model. These services must be operational before other system services can become so. The active instances of the core highly available services generally run on the master node of the cluster. Standby instances of the core highly available services are generally run on the vice-master node of the cluster. The cluster membership monitor is responsible for electing both the master and the vice-master nodes from among all eligible nodes. Eligible nodes are typically diskfull system controller, while nodes that are not eligible are typically diskless satellites.

The cluster membership monitor entity on the master node is responsible for detecting members that join or leave the cluster. The cluster membership monitor API provides information on currently participating members, i.e. nodes that have joined the cluster. It also provides notifications on members that join and leave the cluster as well as notifications of master and vice-master node elections.

The cluster membership monitor is also provisioned with information about potential cluster members. This provisioning can take place at cluster startup or when the cluster is active.

Figure 1:
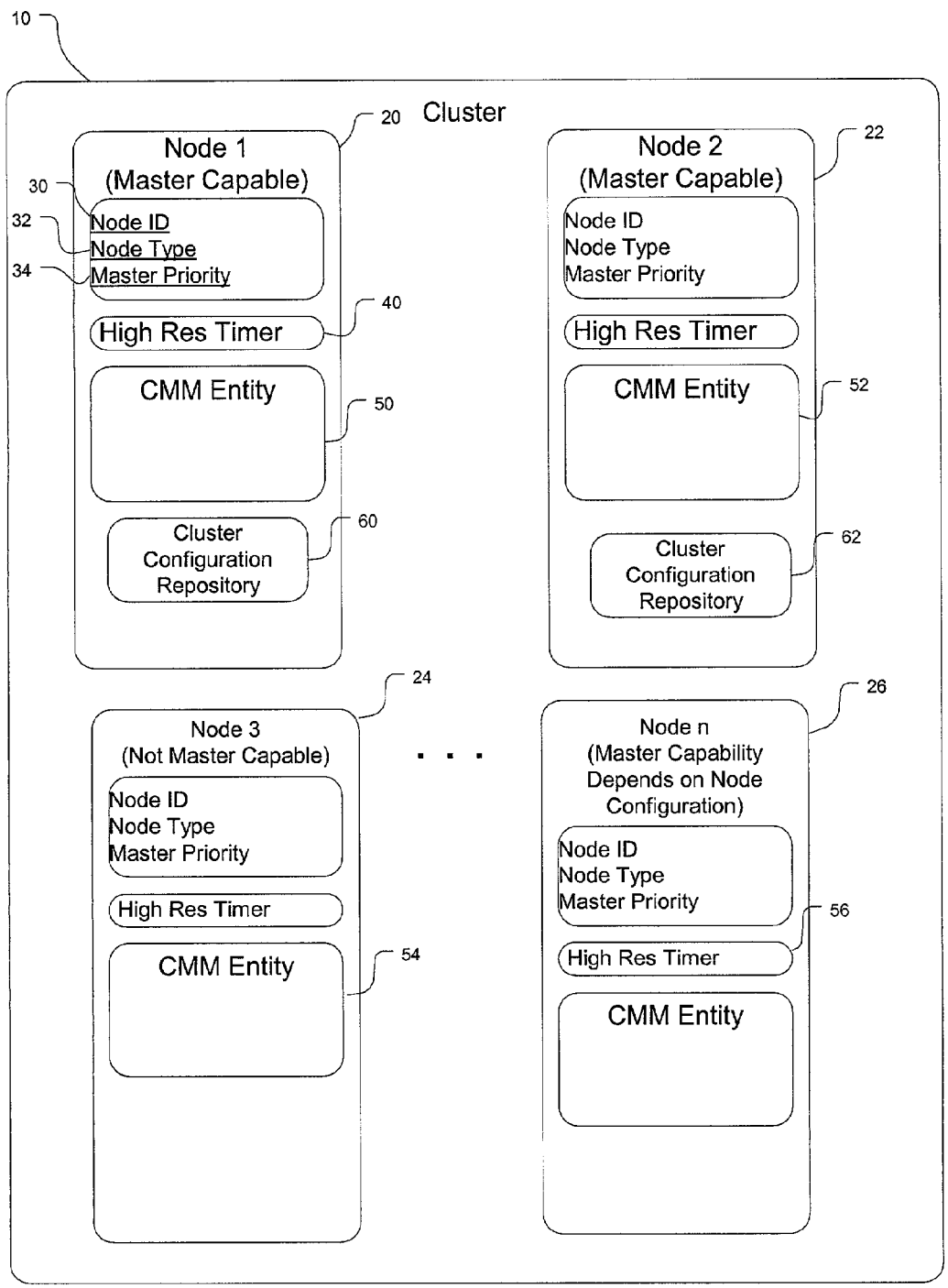
FIG. 1 is a diagram representing a cluster with various nodes, including basic node elements used by the cluster membership monitor, in accordance with an embodiment of the present invention.

Referring to FIG. 1, a cluster 10 is a grouping of n nodes 20, 22, 24, and 26. Node configuration is maintained in a cluster configuration repository, a copy of which is located on the master and vice-master nodes. Within the repository, a cluster 10 is represented as a table of rows, one row per node. In a preferred embodiment each row contains at least the following information:

| | |
|---|---|
| node name | used for log purposes only |
| node id | unique identifier associated with a node |
| node address | communications address of the node (IP address) |
| node type | non-peer, NSP, HSP |
| node priority | priority for assuming master role (0 = non master) |
| timeout | heartbeat timer for this node |
| retry count | number of missed heartbeats before initiating cluster consensus procedure |

On each node 20, 22, 24, and 26, the node id 30, node type 32 and master priority 34 are known at cluster membership monitor initialization. This information can be retrieved from Non-Volatile Random Access Memory (NVRAM) or the boot image. Node ids 30 are unique within the cluster 10 and there exists a partial order on them.

The cluster membership monitor is able to deduce whether a node 20, 22, 24, or 26, is able to act as a cluster master by examining certain information. Each node 20, 22, 24, and 26, provides a lightweight access high-resolution timer 40 that is both monotonic and linear but not necessarily persistent over reboot. A hold off timer must be configured (boot image or NVRAM) that is accessible by the cluster membership monitor entity running on master capable nodes 20, 22, and 26. This timer is used to configure the time that the cluster membership monitor entities on master capable nodes are to wait for a higher priority master node to make itself known.

In an alternate embodiment the configuration data is stored in LDAP. A start-up configuration file is also provided due to the inability of the LDAP server to be started prior to the master election. The start-up configuration file is stored in a flat file. This file is not an LDAP backup, and contains only the minimal configuration needed to elect a master. At first boot, or after a software upgrade, this file must be provided by software load.

In this alternate embodiment each diskfull node contains its own configuration file to avoid conflicts. Node eligibility will be determined by whether the node can access the configuration file or not. A node which cannot open, read, and write its configuration file cannot be eligible.

In the alternate embodiment the cluster membership monitor is the only entity allowed to modify this file. When a configuration change occurs in LDAP tree, the cluster membership monitor is notified and updates the configuration file if it is impacted by the change. The configuration file is also updated when the member ship role or the cluster election round number change.

As part of this alternate embodiment, a backup of the configuration file is kept in NVRAM. When a configuration change occurs in LDAP tables, or a membership role has changed, the cluster membership monitor is notified and updates the NVRAM.

Figure 2:
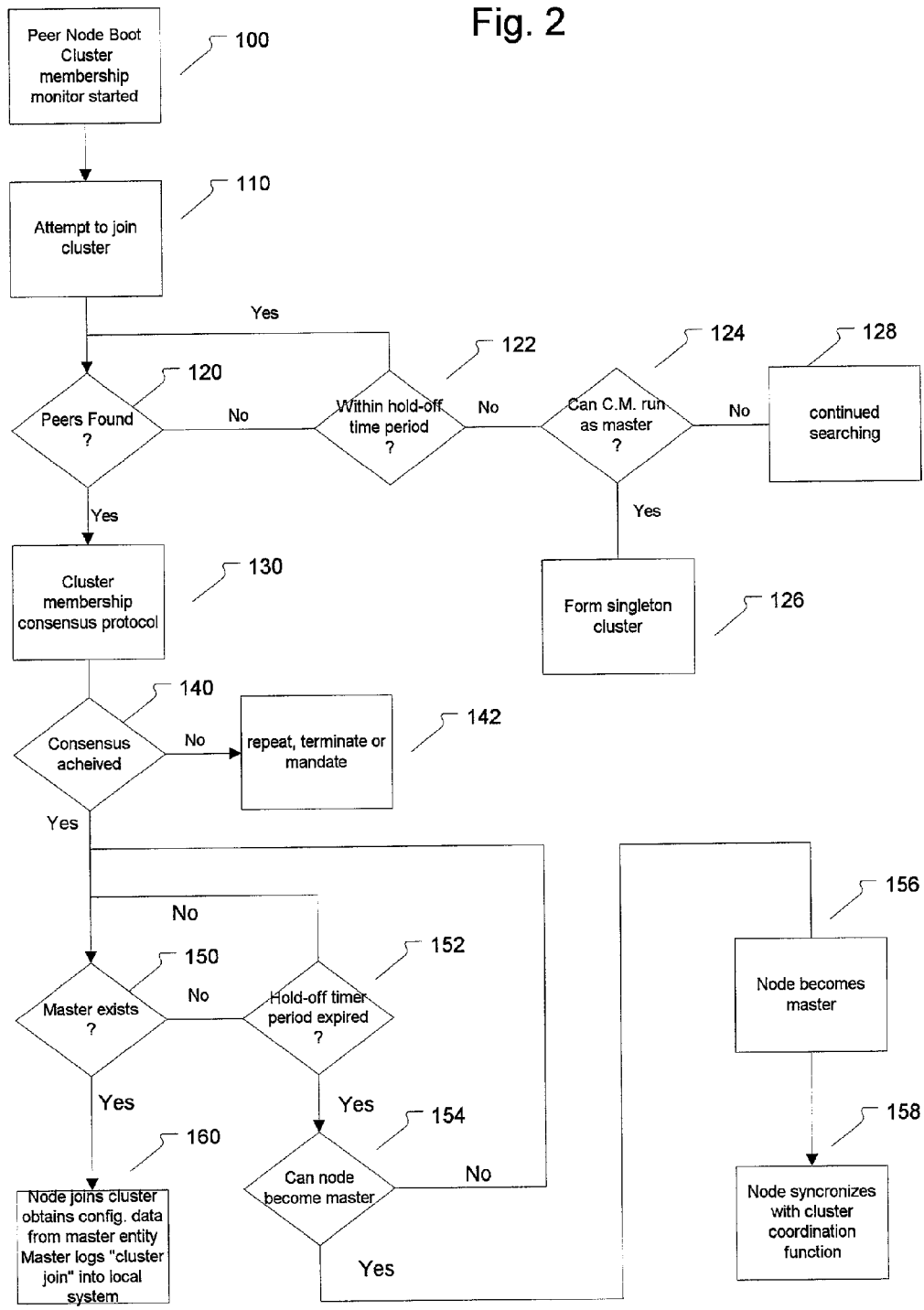
FIG. 2 is a flow chart of a method in which a node joins a cluster and a master node is maintained or selected from within the cluster.

The LDAP repository contains, in its preferred embodiment, the following:
the cluster domain id;
the cluster nodes table, including, the node id, the node name, and a list of administrative attributes corresponding to the node; and
the subnet masks Referring to FIG. 2, the method of joining a cluster according to a preferred embodiment of the present invention includes the steps as follows. A peer node boots and the local cluster membership monitor entity is started as part of the carrier-grade highly available middleware, step 100. The initial default hold-off, time-out, and retry periods are pre-configured in the boot image or NVRAM. The node then attempts to join a cluster, step 110, by establishing contact with its peers via the cluster node membership monitor entities, step 120. This can be done over configured carrier-grade transport protocol (CGTP) physical links. It does not necessarily use the CGTP services. The cluster membership monitor also uses configured CGTP physical links for exchanging heartbeat and protocol messages.

If the hold-off timer period has expired, step 122, and no peers are detected, step 120, the local cluster membership monitor entity checks whether it is capable of running as a master, step 124. If it is, the node forms a singleton cluster. This requires that the cluster membership monitor entity suspend the formation of the cluster until it is able to obtain its configuration data from the cluster configuration repository. If it is unable to run as master, continued searching for peers may be appropriate.

If, however, peer entities are detected, the cluster membership consensus protocol is run with the peer nodes, step 130. If consensus is achieved, step 140, then a search for the master begins. If consensus is not achieved, step 142, the process may be repeated or terminated, or consensus may be mandated.

If there is consensus, step 130, and a master is located, step 150, the peers form a cluster and the master logs the "cluster join" event to its local system log, step 160. If there is no master, and the hold-off period has expired, step 152, the node checks whether it can become the master, step 154, and if so, does step 156. If it is not capable of acting as a master it simply continues handshaking, step 150, with its peers until a master turns up.

Upon taking the master role, the cluster membership monitor entity synchronizes with the cluster coordination function for startup sequencing, step 158. It also monitors the configured nodes that are present for viability. In order to reduce the load of monitoring traffic it may make use of agents to perform fan-out/fan-in of the heartbeat. On the failure of a node it re-initiates the cluster consensus procedure after a configurable delay. This procedure is transparent to other platform entities if no inconsistency is detected.

A cluster membership monitor entity joining a cluster obtains its configuration data from the master cluster membership monitor entity and sets its time-out, retry and consensus protocol timers accordingly. These override the default parameters used during initialization. A node can only join a cluster if its node id is configured in the cluster configuration repository.

Figure 3:
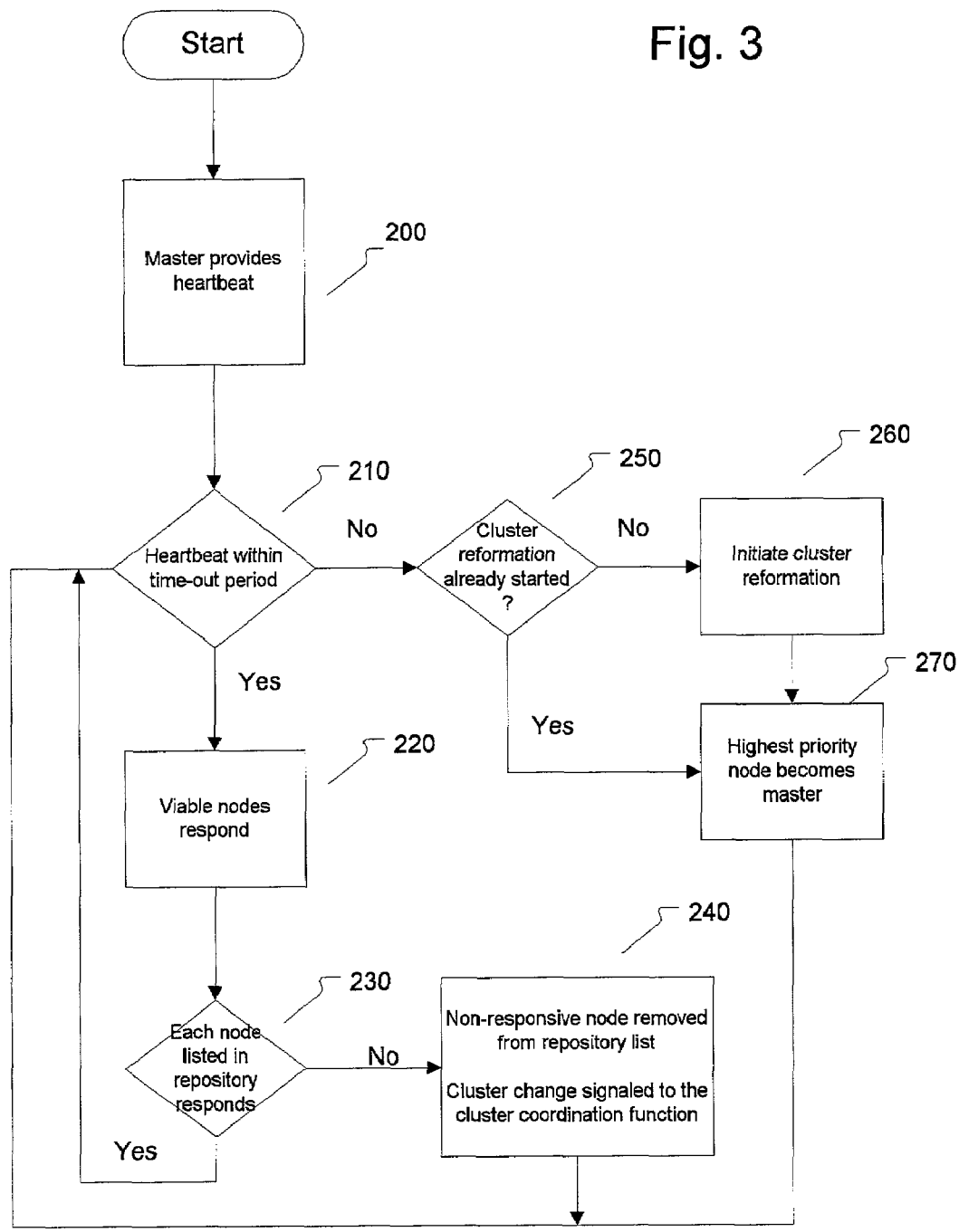
FIG. 3 is a flow chart of a method in which a heartbeat signal is used to provide node viability information.

Referring to FIG. 3, a preferred embodiment of the method for monitoring viability includes the following steps. The master node provides a heartbeat, step 200. Each node maintains a time-out clock, which provides a time period within which the node expects to receive a heartbeat from the master. If the master heartbeat is noticed by a node within the time-out period, step 210, the node responds to the master. Responses to the heartbeat are checked against the cluster configuration repository list of cluster members to ensure that all nodes are currently viable, step 230. If a non-master node no longer responds to heartbeats from the master it is removed from the cluster membership list and a cluster membership change is signaled to the cluster coordination function, step 240.

When a cluster node has not received a heartbeat message within the time-out period, step 210, indicating that the master is no longer viable, the node will check if the cluster reformation has already been started, step 250. If this procedure is not already active, the node will initiate a cluster reformation, step 260. In either event, a new cluster is formed and the node with the highest master priority is elected as the master of the reformed cluster, step 270.

Variations in the manner a cluster is created can occur. The following are examples including the manner in which a preferred embodiment of the present invention would handle each event. In the event two clusters merge, the node with the highest master priority among the two clusters will be elected as the new master. When a new node is detected by the hardware (e.g. Hot Swap Manager) the node is booted according to its software load configuration parameters. Once its cluster membership monitor entity is started it will join the cluster if it has been configured as a member in the cluster configuration repository.

Management can remove or add nodes to the cluster by updating the cluster membership table in the cluster configuration repository. These updates are automatically forwarded to the master cluster membership monitor, which propagates the change throughout membership configuration parameters.

A node is not required to be a member of a cluster in order to communicate with cluster members using raw RTP or standard protocols such as UDP or TCP/IP.

Additional embodiments include a user space process operating over UDP. Each cluster membership monitor entity may also comprise two entities. A kernel entity that deals with the heartbeat exchanges and a user level daemon that deals with consensus and master election procedures. A kernel implementation for the low level protocol elements allows tighter values on the timers and improves node failure detection times as well as reducing the time and overhead required to achieve cluster membership consensus.

In order to support split mode software upgrades the cluster membership monitor is required to be service domain aware. The domain name and or cluster incarnation number could be used by the cluster membership monitor algorithms to logically partition the cluster and would be required at boot time. Candidate peers for a cluster must belong to the same domain and or cluster incarnation.

In an alternate embodiment to improve reconfiguration responsiveness to node failures the cluster membership monitor may provide a mechanism to allow external entities to inform it of a node failure. This is useful in cases where the external mechanism can detect a node failure sooner than the cluster membership monitor heartbeat protocol and it relies on the cluster membership monitor to signal the change in cluster membership to the availability management services.

System services and highly available aware applications using whatever redundancy model may be appropriate and running on any peer node combination that is required can use a cluster membership API. Cluster membership participation information can be retrieved synchronously while cluster membership changes can be received asynchronously by registering for notifications. The API also contains interfaces that control the membership of the cluster.

In a preferred embodiment, the cluster membership monitor API exports interfaces to allow other cluster system services and highly available aware applications to retrieve information about current cluster members and to be notified of cluster membership changes. These interfaces include: cmm_connection_prepare, cmm_master_getinfo, cmm_vicemaster_getinfo, cmm_member_getinfo, cmm_node_getid, cmm_member_getall, cmm_member_getcount.

Cmm_connection_prepare( ) prepares the connection to the cluster membership monitor. Cmm_master_getinfo( ) returns the current master node information. Cmm_vicemaster_getinfo( ) returns the current vice-master node information. Cmm_member_getinfo( ) returns information about the cluster member identified by the node identifier. Cmm_node_getid( ) returns the node identifier of the caller's node. Cmm_member_getall( ) returns a list of currently participating cluster members, a list entry for each node that is responding to heartbeat messages. Cmm_member_getcount( ) returns the number of current cluster members. The cluster member information returned includes the name, IP address, identifier, and type of node. The caller is responsible for allocating enough space for the cluster member table.

Cmm_cmc_register registers the function indicated by the callback argument with the local cluster membership monitor entity. A highly available system service is provided with the cluster membership change information when the function is called. The highly available system service must use the cmm_notify_getfd( ) and cmm_notify_dispatch( ) functions to receive and dispatch messages from the local cluster membership monitor entity. Registering sets up the callback function to be invoked in response to messages sent to the service from the local cluster membership monitor entity. A service need only register once to receive cluster membership change notifications. An error is returned when a service attempts to register more than once.

Cmm_cmc_unregister( ) removes the service's registration with the local cluster membership monitor entity so that no further delivery of cluster membership change notifications are made. If the system service's callback function is active when the unregister request is made, the request will be performed after the callback returns to completion.

The cluster membership monitor API also exports interfaces to allow certain highly available services the ability to administratively control cluster membership.

It will be apparent to those skilled in the art that various modifications and variations can be made in the system for managing, maintaining, and using cluster membership data within a clustered computer network of the present invention without departing from the spirit or scope of the invention. Thus, it is intended that the present invention covers the modifications and variations of this invention provided they come within the scope of the appended claims and their equivalents.

What is claimed is:

1. A method for joining a cluster with a cluster membership monitor within a clustered computer network, comprising the steps of:
   starting a local cluster membership monitor entity on a node when it boots;
   with the local cluster membership monitor entity, establishing contact with peer cluster membership monitor entities on peer nodes of the cluster;
   when the peer nodes are found, performing a consensus protocol with the booting node and the found peer nodes;
   when the consensus protocol performing results in a consensus being achieved, determining whether one of the found peer nodes is a master node of the cluster;
   if the master node is determined, joining the cluster with the booting node; and
   using the local cluster membership monitor entity on the booting node to obtain configuration data from a master cluster membership monitor entity located on the master node and configuring the booting node based on the obtained configuration data.

2. The method of claim 1, further comprising the step of logging in a local system log of the master node a cluster joining event indicating addition of the booting node as one of the peer nodes of the cluster.

3. A system for monitoring cluster membership within a clustered computer network, comprising
   a plurality of peer nodes communicatively linked within the clustered computer network and each locally running a cluster membership monitor and having a master node priority value;
   wherein a one of the peer nodes having the highest of the master node priority values is elected as a master node;
   wherein the one of the peer nodes elected as the master node further stores a cluster configuration defining a set of the peer nodes which are members of a cluster and defining configuration data for the member peer nodes;
   wherein the master node periodically transmits a heartbeat to each of the member peer nodes and viable ones of the member peer nodes respond to provide an indication of viability; and
   wherein the locally running cluster membership monitor on a booting one of the plurality of peer nodes obtains at least a portion of the configuration data from the master node and configures the booting one of the plurality of peer nodes based on the obtained configuration data.

* * * * *

UNITED STATES PATENT AND TRADEMARK OFFICE
CERTIFICATE OF CORRECTION

| | |
|---|---|
| PATENT NO. | : 7,039,694 B2 |
| APPLICATION NO. | : 09/847044 |
| DATED | : May 2, 2006 |
| INVENTOR(S) | : Mark A. Kampe et al. |

It is certified that error appears in the above-identified patent and that said Letters Patent is hereby corrected as shown below:

Column 8, lines 27-36, to read:

4. The system of claim 3, wherein the viable ones of the member peer nodes only perform the responding when the heartbeat is received within a period of time defined in the configuration data and when not received with the period of time, at least one of the viable ones of the member peer nodes intiates a cluster reformation which includes determining a new master node among the viable ones of the member peer nodes based on the master node priority values.

5. The system of claim 4, wherein the new master node stores the cluster configuration definign a new set of the peer nodes which are members of the clusters and periodically transmits a heartbeat to each of the peer nodes in the new set of cluster members.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,039,694 B2
APPLICATION NO. : 09/847044
DATED : May 2, 2006
INVENTOR(S) : Mark A. Kampe, David Penkler and Rebecca A. Ramer It is certified that error appears in the above-identified patent and that said Letters Patent is hereby corrected as shown below:

Column 8, line 34, "definign" should be --defining--

Signed and Sealed this

Nineteenth Day of December, 2006

JON W. DUDAS
*Director of the United States Patent and Trademark Office*